United States Patent [19]

Arimilli et al.

[11] Patent Number: 5,287,482
[45] Date of Patent: Feb. 15, 1994

[54] INPUT/OUTPUT CACHE

[75] Inventors: Ravi K. Arimilli, Round Rock; Sudhir Dhawan, Austin; James O. Nicholson, Austin; David W. Siegel, Austin, all of Tex.

[73] Assignee: International Business Machines Corporation, Armonk, N.Y.

[21] Appl. No.: 912,043

[22] Filed: Jul. 9, 1992

Related U.S. Application Data

[63] Continuation of Ser. No. 702,440, May 16, 1991, abandoned, which is a continuation of Ser. No. 297,712, Jan. 13, 1989, abandoned.

[51] Int. Cl.⁵ ............................................. G06F 13/00
[52] U.S. Cl. ........................... 395/425; 364/DIG. 1; 364/243.4; 364/243.41; 364/243.5; 364/245.5; 364/245.6
[58] Field of Search ........................ 395/425, 275, 800

[56] References Cited

U.S. PATENT DOCUMENTS

| | | | |
|---|---|---|---|
| 3,713,107 | 1/1973 | Barsamian | 364/200 |
| 4,071,890 | 1/1978 | Pandeya | 364/200 |
| 4,075,686 | 2/1978 | Calle et al. | 364/200 |
| 4,395,758 | 7/1983 | Helenius et al. | 364/200 |
| 4,451,884 | 5/1984 | Heath et al. | 364/200 |
| 4,453,216 | 6/1984 | Chiba et al. | 364/200 |
| 4,476,526 | 10/1984 | Dodd | 364/200 |
| 4,493,051 | 1/1985 | Brezzo et al. | 364/900 |
| 4,509,116 | 4/1985 | Lackey et al. | 364/200 |
| 4,513,369 | 4/1985 | Sato | 395/425 |
| 4,564,900 | 1/1986 | Smitt | 364/200 |
| 4,669,043 | 5/1987 | Kaplinsky | 395/400 |
| 4,695,948 | 9/1987 | Blevins et al. | 395/275 |
| 4,700,292 | 10/1987 | Campanini | 364/200 |
| 4,729,094 | 3/1988 | Zolnowski et al. | 364/200 |
| 4,821,185 | 4/1989 | Esposito | 395/275 |
| 5,003,463 | 3/1991 | Coyle et al. | 395/275 |
| 5,161,219 | 11/1992 | Nicholson et al. | 395/425 |

OTHER PUBLICATIONS

IBM Technical Disclosure Bulletin, J. W. Kemp, D. P. Tuttle and M. A. Wieland, vol. 28, No. 9, Feb. 1986.
IBM Technical Disclosure Bulletin, J. T. O'Quin II, vol. 29, No. 4, Sep. 1986.

Primary Examiner—Paul V. Kulik
Attorney, Agent, or Firm—Kenneth C. Hill; Andrew J. Dillon

[57] ABSTRACT

A cache for use with input/output devices attached to an input/output bus. Requests for access to system memory by an input/output device pass through the cache. Virtual memory addresses used by the input/output devices are translated into real addresses in the system memory. Virtual memory can be partitioned, with some virtual addresses being mapped to a second memory attached to the input/output bus.

7 Claims, 6 Drawing Sheets

INPUT/OUTPUT CACHE

This is a continuation of application Ser. No. 07/702,440, filed May 16, 1991, which was a continuation of application Ser. No. 07/297,712, filed Jan. 18, 1989, both now abandoned.

CROSS-REFERENCE TO RELATED APPLICATIONS

The present application contains subject matters related to copending application Ser. No. 07/996,501, filed Dec. 23, 1992, which is a continuation of application Ser. No. 07/751,590, filed Aug. 22, 1991, now abandoned, which are a continuation of application Ser. No. 07/297,779, titled INPUT/OUTPUT CACHE WITH ACCESS PROTECTION, filed Jan. 13, 1989, now abandoned, AND application Ser. No. 07/919,817, filed Jul. 24, 1992, which is a continuation of application Ser. No. 07/711,343, filed May 31, 1991, now U.S. Pat. No. 5,161,219, which was a continuation of application Ser. No. 07/297,775, titled COMPUTER SYSTEM WITH INPUT/OUTPUT CACHE, filed Jan. 13, 1989, now abandoned, and all assigned to the assignee hereof, and all of which are incorporated by reference herein.

BACKGROUND OF THE INVENTION

1. Technical Field

The present invention relates generally to computer systems, and more specifically to a cache controller for use with input/output devices.

2. Background Art

Computer systems generally have several different storage layers defining a memory hierarchy. These layers typically include registers in a central processing unit, main system memory, and mass storage, such as disks. The performance of these different levels is quite different; the processor registers are much faster than system memory, which in turn is significantly faster than access to mass storage.

In order to improve system performance, a cache, consisting of a small, fast memory, is often used between the central processor and system memory. The cache takes advantage of the locality of reference phenomenon within computer programs to store data which is likely to be reused into the fast memory.

A similar bottleneck occurs between system memory and the much slower mass storage devices and other input/output devices which need to transfer data to and from the system memory. Any system design which makes data transfer between input/output devices, which term as used herein includes mass storage devices, more efficient will have a positive impact on overall system performance. However, traditional caching technology such as used between a central processor and system memory does not work well with input/output devices.

This is due, in large part, to differences in access patterns found with a single central processing unit and a plurality of input/output devices. A central processor is a single unit accessing memory, and makes a large number of relatively random accesses to different locations throughout system memory. Memory accesses by input/output devices have a different pattern of use. Each device usually accesses only a few memory locations, but different devices access different memory locations. In addition, the different devices access memory in unpredictable patterns.

Since some input/output devices access memory relatively infrequently, a cache hit would seldom occur for those devices. This is especially true when some input/output devices, such as disks, read or write a large number of consecutive memory locations. After such a transfer, a cache would tend to be filled with data transferred by that device. Providing a separate cache memory for each input/output device is not generally feasible.

If there are some portions of the main system memory which are accessible by both the input/output devices and the central processor, the central processor may have to access such memory through the input/output cache in order to avoid a cache coherency problem with a normal CPU cache This tends to interfere with use of an input/output cache by the input/output devices.

It would be desirable for an input/output interface device to enable a central processor and input/output devices to have common access to a shared area of main system memory. It would further be desirable for such an interface to provide a mechanism whereby a portion of the memory address space is assigned to devices attached to an input/output bus.

SUMMARY OF THE INVENTION

It is therefore an object of the present invention to provide a system memory to input/output device interface which allows a central processor and input/output devices to access a shared memory area within main system memory.

It is another object of the present invention to provide a system memory to input/output device interface which allows a portion of the memory address space to actually be assigned to input/output devices attached to an input/output bus.

It is a further object of the present invention to provide a system memory to input/output device interface which translates virtual memory addresses into physical addresses within the system memory.

Therefore, in accordance with the present invention, an input/output cache is used to buffer the input/output devices from the main system memory. Each input/output device utilizes a portion of the input/output cache, and the central processor is allocated a section of the input/output cache and accesses the cache in the same manner as an input/output device. All requests, whether made by an input/output device or by the central processor, which are to memory locations in the system memory address space which are actually located in a device attached to the input/output bus are automatically routed to such device in a manner transparent to the requesting input/output device or central processor. Only requests for memory locations which are actually located in the main system memory are actually cached within the input/output cache.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein

DETAILED DESCRIPTION OF THE PREFERRED EMBODIMENT

Figure 1:
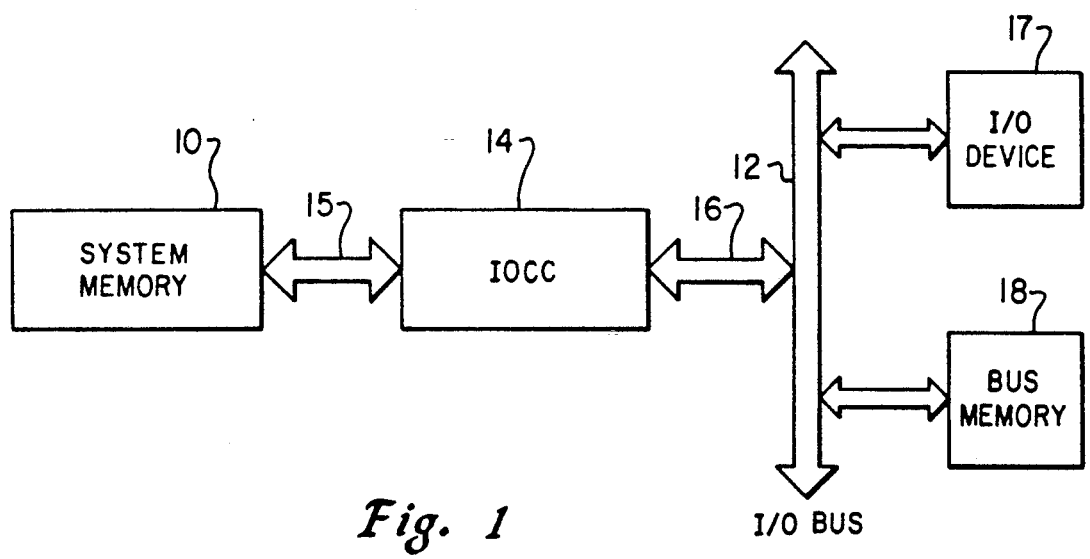
FIG. 1 is a block diagram of a portion of a computer system.

Referring to FIG. 1, a system memory 10 is connected to an input/output (I/O) bus 12 through an input/output cache controller 14 (IOCC). A system bus 15 connects the system memory 10 and IOCC 14, and contains address, data, and control lines. The IOCC 14 is connected to the I/O bus 12 through address, data, and control lines 16.

Input/output device 17 is connected to the I/O bus 12. Input/output devices can include, for example, video displays, disk and tape drive controllers, and serial and parallel I/O ports. As will be described below, bus memory 18 which is addressable as system memory can also be attached to the I/O bus 12. All data transfer between the devices attached to the I/O bus 12 and the system memory 10 occurs through the IOCC 14.

In order to improve the performance of the system memory 10, it may be interleaved as known in the art, or may be otherwise optimized for high speed block transfers. Data is transferred along system memory bus 15 using high speed, block transfer communications. The IOCC 14 is then free to communicate with the devices on the I/O bus 12 as necessary.

In the preferred embodiment, the IOCC 14 performs the functions of a data cache and virtual memory to real memory address translation for the I/O bus 12. In addition, the preferred IOCC 14 performs access authority checking on all I/O requests. In the preferred embodiment, data writes are not written directly through to the system memory 10. Instead, they are retained in the IOCC 14 until such time as the written data is removed from the IOCC 14.

Figure 2:
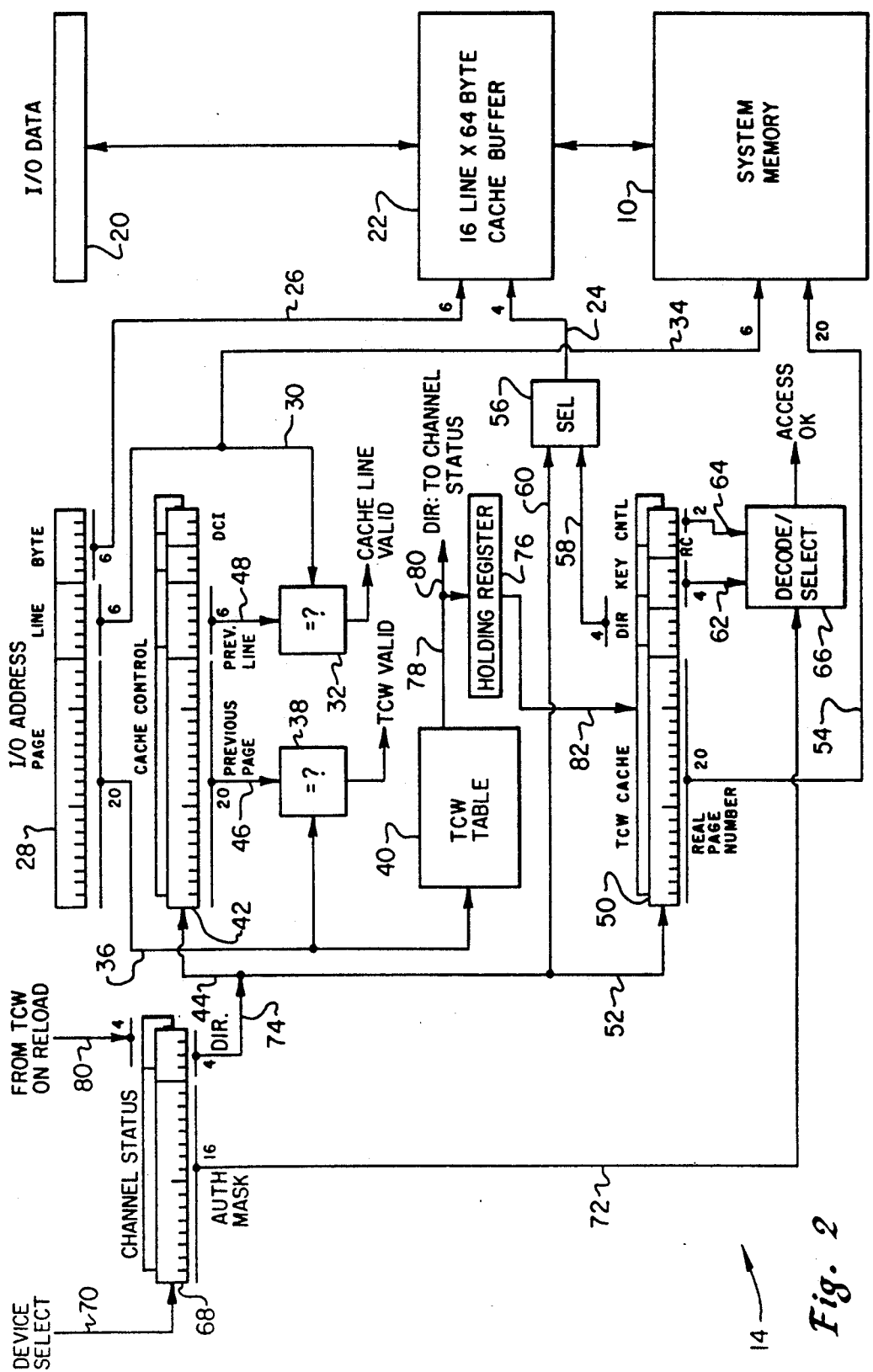
FIG. 2 is a diagram of an input/output cache controller.
Figure 3A:
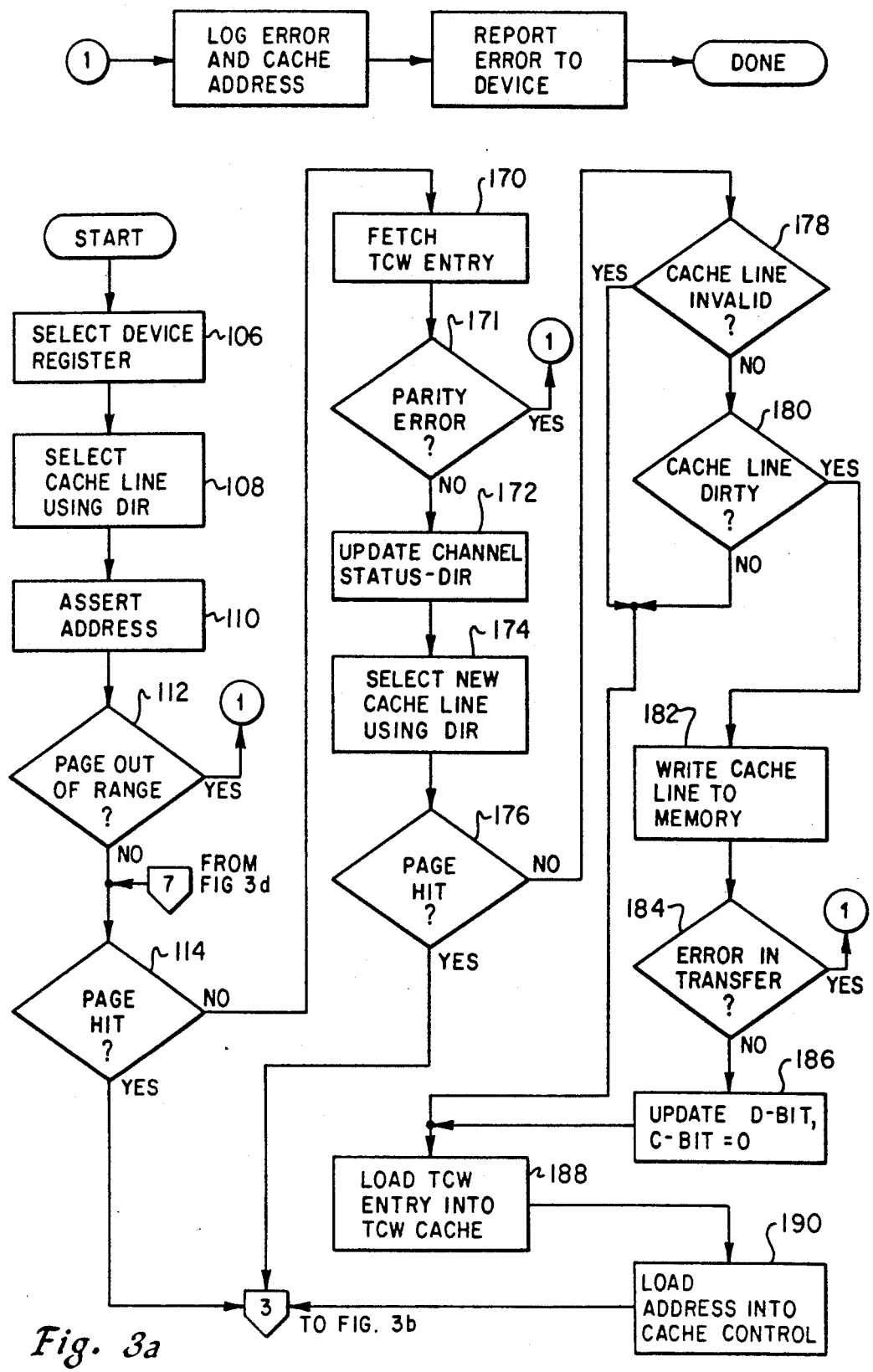
FIGS. 3a, 3b, 3c, and 3d are a flowchart describing operation of the cache controller of FIG. 2.
Figure 3B:
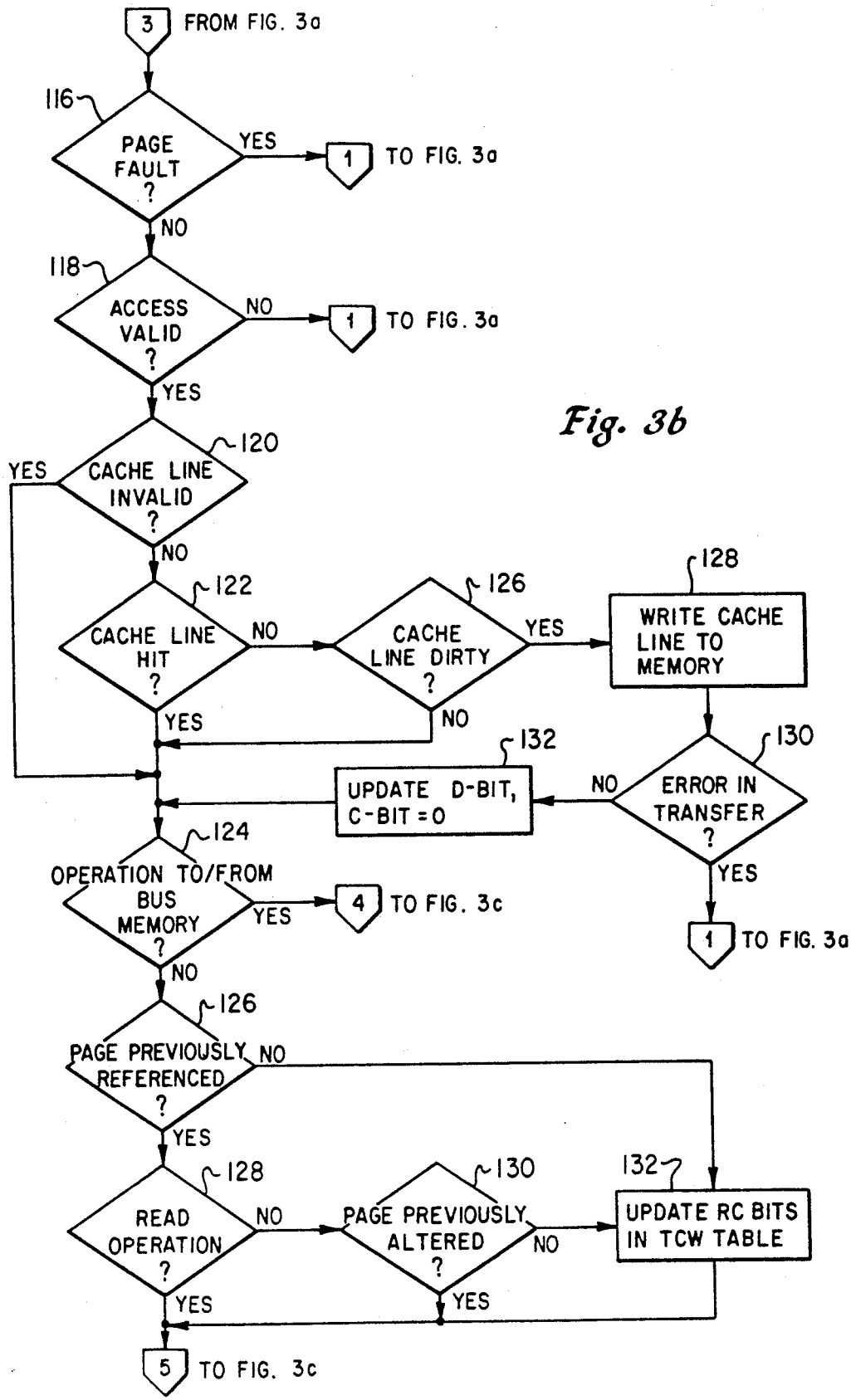
Figure 3C:
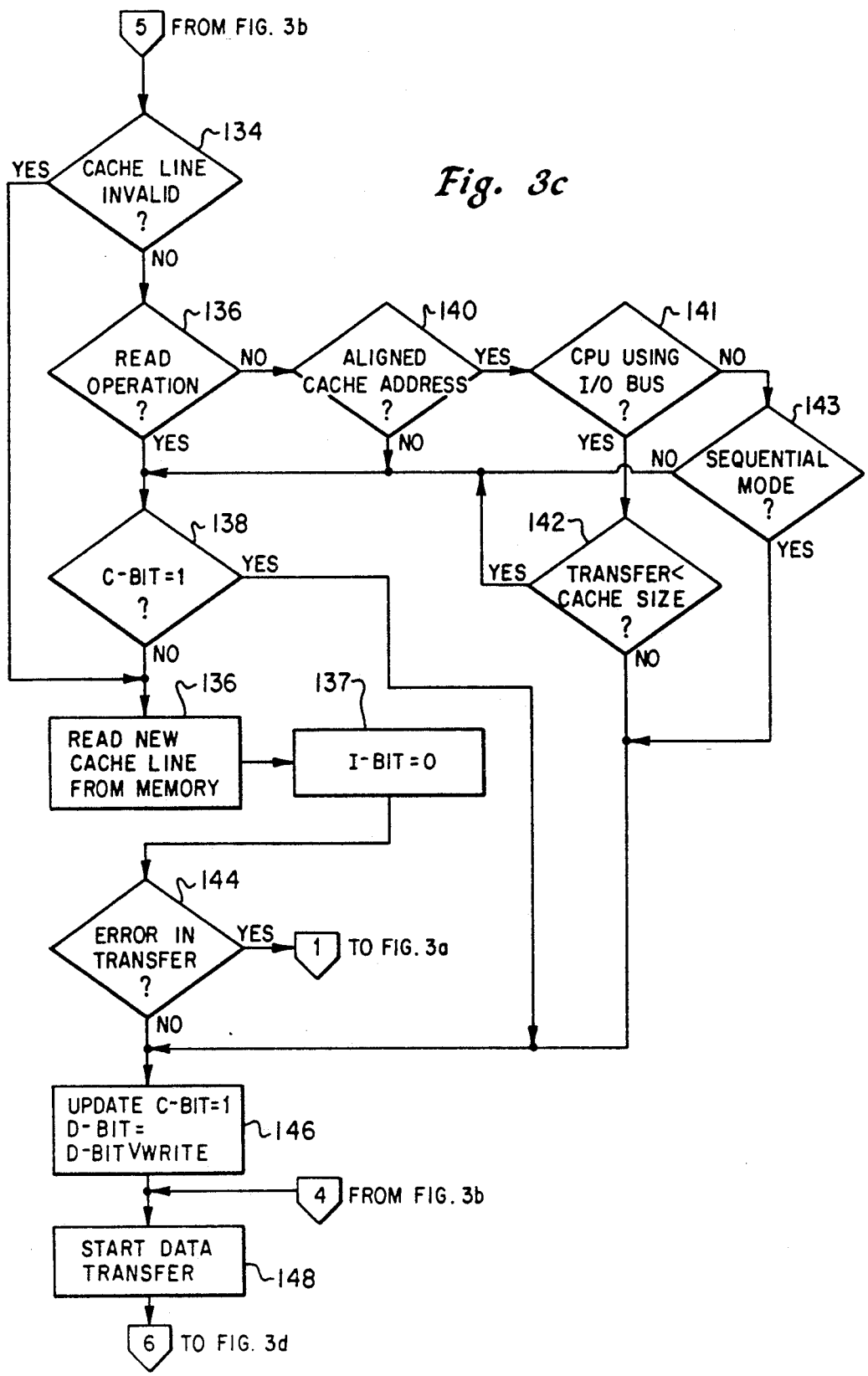
Figure 3D:
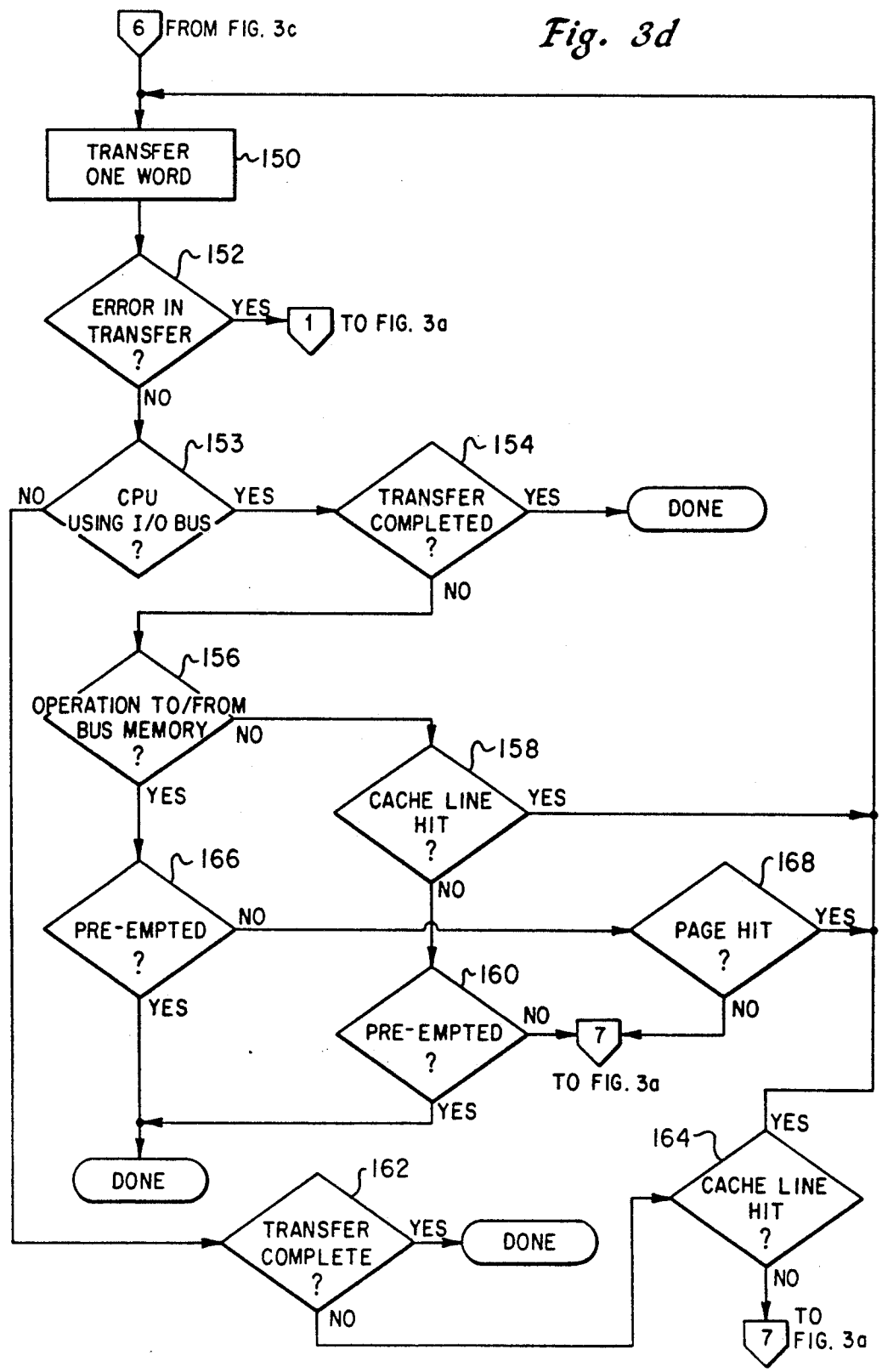

Referring to FIG. 2, a detailed diagram of the IOCC 14 is shown. I/O data buffer 20 is connected to a cache buffer 22. This cache buffer 22 is preferably organized as 16 lines of 64 bytes each. The cache buffer 22 is in turn connected to the system memory 10. Data is transferred between the cache buffer 22 and the system memory 10 using a high speed, block data transfer The precise nature of this block transfer does not form part of the present invention.

The system memory 10 is preferably organized into pages, and further into lines within pages Although the sizes of the pages and lines do not form a part of the present invention, the page size of the embodiment described herein is 4K bytes, and the line size is 64 bytes There are therefore 64 lines per page. Transfers to and from the system memory 10 are done in minimum sized units of one line.

Data is transferred between the I/O data buffer 20 and the cache buffer 22 according to memory locations addressed by 4 bit address line 24 and 6 bit address line 26. The value on line 24 selects one of the 16 lines within the cache buffer 22, while the value on line 26 selects one of the 64 bytes within the selected line.

Addresses from the I/O bus 12 are stored in I/O address buffer 28. The six Least Significant Bits (LSB) of the I/O address buffer 28 are used as the byte address value for the cache buffer 22 supplied by line 26. The next six more significant bits of the I/O address buffer 28 are connected through signal line 30 to a comparator 32, and through line 34 to the system memory 10. Within the system memory 10, the signal on line 34 is used to select one line out of 64 within a page.

The 20 Most Significant Bits (MSB) of the I/O address buffer 28 are connected through line 36 to a comparator 38 and a Translation Control Word (TCW) table 40. The TCW table 40 is also known in the art as a page table. It is a fast, dedicated memory connected to the IOCC 14, and does not reside in the address space of the system. If a large enough dedicated memory is not available for storing the entire TCW table 40, the dedicated memory can be used as a cache for the table, with the table actually stored in the main address space of the system. This is generally undesirable from a performance viewpoint.

In many systems, the I/O devices will have access to only a small part of the system address space. Only that part of the address space to which the I/O devices have access need be represented in the TCW table 40. In such systems, the dedicated memory for the TCW table 40 need not be extremely large, and can hold the entire TCW table 40 needed for the I/O devices. The organization of the TCW memory 40 is described below.

A file of cache control registers 42 contains 16 separate registers. One register of the file 42 is active at any given time, with the active register being selected by a 4 bit signal on line 44. The 20 MSB of the currently selected cache control register 42 are connected to the comparator 38 through signal line 46. The next six less significant bits of the selected cache control register 42 are connected to comparator 32 through signal line 48. The three LSB are labelled D, C, and I. These bits are a dirty bit (D-bit), current bit (C-bit), and invalid bit (I-bit). Use of these bits is described in connection with FIG. 3.

A file of 16 registers 50 defines a TCW cache, with one active register being selected by the value on signal line 52. The value on line 52 is always the same as the value on line 44. The 20 MSB of the selected TCW cache register 50 are connected to the system memory 10 through address line 54. This 20 bit address is used to address one real page within the system memory 10.

The next less significant bits of the TCW cache 50 define a DIR field which is 4 bits wide. The purpose of the DIR field the function of the DIR signal will be described below. The DIR signal is connected to a select circuit 56 through signal line 58. A 4-bit signal line 60 is also connected to the select circuit 56, and contains the same value as found on signal line 52.

The 8 LSB of the TCW cache 50 are divided into two 4-bit fields The four LSB are control bits having functions which will be described below. The next four bits define a KEY field, which is used to determine access authorization for each page in the system memory 10. The KEY bits and the lower two control bits are connected through signal lines 62 and 64 respectively to a DECODE/SELECT circuit 66

A file of channel status registers 68 contains 16 registers, one of which is active depending on the value of a four bit signal line 70. The signal line 70 is driven by a DEVICE SELECT signal as will be described below.

The 16 MSB of the channel status registers 68 are connected to the DECODE/SELECT circuitry 66 through signal line 72. The four LSB define a DIR field, and are communicated from the active channel status register 68 on line 74, which is connected to the signal lines 44, 52, and 60 described above.

The TCW table 40 is a memory containing, at each location, an entry having an identical format to that of the TCW cache 50. Thus, each entry in the TCW table 40 contains a real page number, a DIR entry, a KEY, and four control bits. When an entry is read from the TCW table 40, it is communicated to a holding register 76 along signal line 78. Four bits of an entry in the TCW table 40, corresponding to the DIR field, are communicated directly to the DIR field of the active channel status register 68 on signal line 80. When an entry from the TCW table 40 is loaded into a TCW cache register 50, it is communicated from the holding register 76 along signal line 82.

Each device attached to the I/O bus 12 is represented by one of the 16 channel status registers 68. The DEVICE SELECT signal connected to line 70 uniquely identifies one of the devices attached to the I/O bus 12. This signal indicates which device is performing an I/O operation. The device select signal may be generated in any desired manner. When the preferred IOCC 14 is used with a computer system utilizing an IBM microchannel bus, the DEVICE SELECT signal is preferably the same as the bus arbitration signal. On the microchannel bus, each device has a unique arbitration level, and this identification can be used as the DEVICE SELECT signal.

When one of the channel status registers 68 is selected by the signal on line 70, the four LSB are used as a DIR (directory) signal to select a cache control register 42, a TCW cache register 50, and one line of the cache buffer 22. Except for one situation described below, the select circuitry 56 causes the signal on lines 60 to be connected to line 24 in order to select a line of the cache buffer 22. The selected cache control register 42, TCW cache register 50, and line in the cache buffer 22 always correspond to describe the virtual page number, line number, and real page number of the selected line within the cache buffer 22. The virtual page number of the selected line is stored in the 20 MSB of the selected cache control register, while the system memory line number corresponding to the line number of the selected line in the cache buffer 22 is stored in the six LSB of the cache control register 42. The corresponding real page number is stored in the 20 MSB of the TCW cache register 50.

The virtual page number and line number from the cache control register 42 are compared in comparators 38 and 32, respectively, to the virtual page number and line number in the I/O address buffer 28. If both of these comparisons are a match, the signals TCW VALID AND CACHE LINE VALID indicate this fact. When these signals indicate a match, the requested virtual address in the I/O address buffer 28 currently resides in the cache buffer 22 at the line number indicated on line 24.

In the preferred access protection mechanism, each page is assigned a subclassification, also referred to as a subject. Processes and devices which are authorized to have access to a particular subject are allowed access to a virtual page containing that subject. The 16 MSB of the channel status register defines, for each device attached to the I/O bus 12, those subjects which that device is authorized to access. This authorization is implemented as a bit map defining an authorization mask. Of 16 possible subjects, those to which a device is authorized access will have a 1 in the corresponding bit position, and a 0 resides in those bit positions corresponding to subjects for which access is not authorized.

The KEY field of the TCW cache 50 defines the subject for the corresponding page, and is used to select a bit position from the authorization mask signal present on line 72. For example, if the signal on line 62 is $F_{16}$, the left most bit of the activated channel status register 68 must be a 1 for the current device to be authorized access to the current page. Each page has exactly one associated access authority classification, so that one page is the minimum granularity for access classification mapping.

In addition to subject matter access, read and write access is indicated by the 2 LSB of the TCW cache register 50. These bits also indicate whether there is a page fault (this page is not in system memory 10, having been paged out), or whether the accessed memory page is found in a bus memory instead of system memory 10. These signals are also connected to the DECODE/SELECT circuit 66, as are read/write signals (not shown) from the I/O bus 12. These signals are used to ensure that a device is not, for example, attempting to perform a write operation into a read-only virtual page. The ACCESS OK signal out of the DECODE/SELECT circuit 66 determines whether the attempted access is valid. The meanings of the 2 LSB in the TCW cache 50 are described in Table I.

Table I - 2 LSB Control Bits

00—Bus Memory
01—Page Fault
10—Read Only
11—Read/Write

Bus memory is memory connected to the I/O bus 12. Portions of the bus memory address space may be mapped to a part of the system address space. Thus, to devices on the I/O bus 12, and to the system central processor, bus memory appears the same as system memory 10. However, the cache buffer 22 is not used to cache the bus memory. The differences in handling bus memory are shown in FIG. 3. Bus memory can be used to attach I/O devices with a large memory requirement, such as video display controllers.

The remaining two bits of the control field of the selected TCW cache register 50 are labelled R and C, meaning Referenced and Changed, and are preferably used by a virtual memory manager to determine which virtual pages should be swapped to disk when a page fault occurs. Use of the RC bits for memory management is known in the art.

The design of the cache controller of FIG. 2 is such that it can be accessed by a system central processor as well as the I/O devices attached to the I/O bus 12. The flow of control described in FIG. 3 is basically the same regardless of whether the IOCC 14 is being used by a central processor or an I/O device. The first few steps of the control description are used only when a system central processor is accessing memory through the IOCC 14; the remaining steps are used by both the central processor and I/O devices. A system in which the central processor accesses the I/O bus 12 is described in Application Ser. No. 07/297,775, filed Jan. 13, 1989, now abandoned, which has been incorporated by reference.

A system central processor which is performing a load or store operation through the IOCC 14 can be operating in one of two modes. If the central processor is operating in a supervisor mode, it always has access to all memory locations, and access checking is not performed. If the central processor is operating in non-supervisory mode, the access checks are made as described in FIG. 3. Not all accesses to devices attached to the I/O bus 12 are routed through the IOCC 14. Only those memory accesses which are to memory locations in the normal system memory address space exercise operation of the IOCC 14. Accesses to a separate I/O address space, such as supported by Intel's 80×86 family of processors, bypass the IOCC 14 and are routed directly to the I/O bus 12. For accesses of this type, a bypass flag is set to indicate that the IOCC 14 is to be bypassed.

Detailed operation of the IOCC 14 will now be described in connection with FIG. 3, which consists of FIGS. 3a, 3b, 3c and 3d considered together In the preferred embodiment, the central processor appears to the IOCC 14 as merely another I/O device, having its own reserved channel status register 68 as described in connection with FIG. 2.

The devices connected to the I/O bus 12, including a system central processor if it is attempting to perform a load/store operation through the IOCC 14, arbitrate to determine which device will have access to the IOCC 14. As described above, the winner of such arbitration will have a unique arbitration level identifier, which is used as the signal DEVICE SELECT.

At several points within the control flow, error checking will be performed. If an error is detected, control will jump to step 94, which causes the error to be logged. Preferably, a 4-bit error indicator and the page and line from the buffer 28 on which the error occurred are placed into the channel status register 68 for the selected device. The register 68 is reloaded with the authorization mask and DIR field after the error is handled. The error is then reported to the device 96.

The signal DEVICE SELECT is used to select a device register 106, and the appropriate cache line in the cache buffer 22, and corresponding registers in the cache control register file 42 and the TCW cache register file 50, are selected using the DIR signal 108. Also at this time, the device winning the arbitration battle for the I/O bus 12 asserts the desired address 110.

A page out of range test 112 is made to determine whether the asserted address is within that portion of the virtual memory space which can be accessed by I/O devices. If the page is out of range, control passes to step 94 and an error is logged and reported. If the page is within the appropriate range, a test is made to see if there is a page hit 114 between the asserted address and the cache buffer 22. This determination is made in comparator 38, and is indicated by the signal TCW VALID.

If the previously accessed page stored in the cache control register 42 matches the page within the I/O buffer 28, there is a page hit and control passes to step 116. A test is made for a page fault 116, which is indicated by the 2 LSB of the selected TCW cache register 50 using the bit pattern shown in Table I. If there is a page fault, an error is logged and reported to the processor.

If there is no page fault, indicating that the requested virtual page currently resides in system memory 10 or in a bus memory mapped to the system address space, a check is made to see whether the requesting device is authorized to access that page 118. In addition to the subject matter check made by comparing the KEY field of the TCW cache register 50 to the authorization mask field of the channel status register 68, a check is made to ensure that a device is not attempting to write into a read only page. If the signal ACCESS OK indicates that the attempted access is not valid, an error is logged and reported to the processor.

If the device does have valid access to the requested page, a check is made to see whether the selected cache line in the buffer 22 is invalid This check is made by testing the I-bit of the selected cache control register 42. When the I-bit is set, data exists in the selected cache line within the buffer 22 which might not be accessible to the device making access. This is a security feature which prevents processes and devices from accessing data from each other's memory space. The I-bit is set when an I/O transfer using the cache line is completed, and the data is not erased from the cache line within the buffer 22. In the preferred embodiment, whenever a cache line is written from the buffer 22 to system memory, that cache line is filled with zeros, effectively deleting the data which was previously stored therein. However, when data is being read from system memory 10 to an I/O device, the last line of data loaded into the cache buffer 22 remains untouched. When an I/O transfer completes, a system supervisor writes a 1 into the corresponding I-bit unless that cache line was written to system memory 10 and zeroed out.

If the cache line invalid test 120 gives a yes result, the test of step 122 is skipped. Step 122 is a test to determine whether the cache line was a hit. If it is, control drops to step 124. If there is not a cache line hit, the page is correct but the wrong line from that page currently resides in the cache buffer 22. If that cache line is not dirty, as indicated by the D-bit in the cache control register 42, it does not need to be saved. If the cache line is dirty 126, the cache line is written to memory 128 and the cache line zeroed out as described above. If an error occurs in the transfer 130, the error is logged and reported to the processor. If no error occurs, the D-bit and C-bit are both reset to zero 132.

Next, a test is made to see whether this is an operation to or from bus memory 124. This test is made on the 2 LSB of the selected TCW cache register 50 for the pattern defined in Table I. If the operation is a bus memory operation, control skips directly ahead to the data transfer and bypasses the remaining cache operations.

If the operation is to system memory, the result of test 124 will be no, and another test is made to see if the page was previously referenced 126. This test is made of the R-bit in the selected TCW cache register 50, which, if set, indicates that the selected page was previously referenced. If the page was referenced, a test is made to see if the current operation is a read operation 128. If it is not a read operation, a test is made to see if this page has previously been altered. If it has, the RC bits are unchanged, as is the case if the current operation is a read operation. If the page has not previously been altered, and this is a write operation, the RC bits in the TCW table 40, and in the selected TCW cache register 50, are updated 132. They are also updated if the test of step 126 indicates that this page has not previously been referenced.

Next, another test is made to see if the cache line is invalid 134. As described above, this consists of a test of the I-bit. If the cache line is invalid, the next few steps are skipped, which forces a new line to be read from system memory 10 into the cache buffer 136. This destroys the data previously residing on that cache line. Reading a new line 136 into the cache buffer 22 causes the corresponding I-bit to be reset to 137.

If the cache line was not invalid at step 134, a check is again made to see if the current operation is a read operation 136. If so, a check is made to see whether the C-bit is set to 1 138. If the current operation is a write operation, the result of step 136 is no, and a check is made to see whether the requested location is aligned with a cache address 140. This means that the requested location is aligned with a line boundary, which is the case when the 6 LSB of the I/O address buffer 28 are all 0. If the requested location is not aligned, control passes to step 138. If it is aligned, and if the central processor is the device currently using the I/O bus 141, a test is made to see if a current transfer is less than the 64 byte cache buffer size 142. If so, control also passes to step 138. If a transfer larger than 64 bytes is being made, the result of step 142 is no, and control skips around step 136. The effect of reaching this point in the flow of control is that a large write operation, one which will fill every byte of the selected line of the cache buffer 22, is being made. Under these circumstances, it is a waste of effort to read in a line from system memory 10 since every single byte of that line is about to overwritten by the current write operation. Thus, the read 138 from system memory 10 is skipped.

If the central processor was not using the bus 141, a test is made to see whether the I/O device is operating in sequential mode 143. Sequential mode is assigned to devices which read and write large blocks of data, such as disk drives. Sequential mode for a device can be indicated by a bit (not shown) in the channel status register 68. If a device is writing in sequential mode, it is also unnecessary to load the cache line. Thus, if the result of stp 143 is yes, control skips step 136. Otherwise, control passes to step 138.

If the cache buffer 22 load of step 136 is made, the I-bit is set to zero 137, and a check is made to see if there were any errors in the transfer 144. If so, the error is logged and reported to the processor. If not, the C-bit and D-bit in the cache control register 42 are updated 146. The C-bit is set to 1. The D-bit is set to the logical OR of the current value of the D-bit and a signal indicating whether this is a write operation. That is, if the cache line was already dirty, or is now being written into, the dirty bit is set. At this time, the IOCC 14 is properly set up, and the data transfer can begin 148.

A single word of data is transferred 150. This word can be a byte, two bytes, four bytes, or some other value as established by the hardware configuration of the system. In any event, the transfer of step 150 is a single transfer accomplished in one bus cycle. If there is an error in the transfer 152, it is logged and reported to the processor as described above. If the central processor is currently using the I/O bus 153, a test is made to see whether the transfer is complete 154. If so, nothing further is done.

If the transfer is not complete, a test is made to see whether this operation is a bus memory operation 156. As described above, a bus memory operation is indicated by the 2 LSB of the TCW cache register 50. If this is a system memory 10 operation, a test is made to see whether the next address is a cache line hit 158. If so, control returns to step 150 to transfer the next word. If not, a cache line boundary has been crossed, and control drops to step 160. Step 160 is a test to see whether the current I/O operation has been preempted by another device. If not, control returns to step 114, and the entire cache validation process is repeated. If the current operation is preempted in step 160, this operation is completed for now. The central processor must then arbitrate for access to finish its transfer.

If the test of step 156 indicates that the current operation is a bus memory operation, a test is made to see whether the current transfer has been preempted 166. If not, and if the page of the next address matches the page of the current address indicating a page hit 168, control returns to step 150 to transfer the next word. If step 168 does not result in a page hit, control returns to step 114 as described above.

The net effect of the control flow of steps 156 through 168 is to allow operations to bus memory to be preempted at any time, while those to cached system memory locations can be preempted only when a line boundary is crossed.

If the result of step 153 was no, if the transfer is not complete 162, a check is made for a cache line hit 164. If there is a hit, control returns to step 150, and the transfer continues. If not, control returns to step 114. I/O devices cannot be pre-empted; they must give up the I/O bus voluntarily in the preferred embodiment.

Returning to FIG. 3a, the operations to be undertaken if a page miss is detected in step 114 will now be described. If step 114 determines that there was not a page hit, the virtual page currently being accessed by the device is different from the virtual page previously accessed by that device. If this is the case, a next TCW entry is fetched 170 from the TCW table 40 and placed into holding register 76. If there is a parity error 171, it is logged and reported. The next TCW entry is that entry addressed by the 20 MSB of the I/O buffer 28. The 4 LSB of the channel status register 68 are updated 172 using the DIR signals present on line 80. This signal immediately becomes available on line 74, causing a new line in the cache buffer 22, and its corresponding registers in the cache control register file 42 and the TCW cache register file 50 to be selected 174. Comparator 38 then compares the newly selected previous page available on line 46 with the page within the I/O address buffer 28. If there is now a TCW hit 176, the currently requested page was accessed by the same device at a time prior to the immediately preceding access, and that page is still available in the cache control and TCW cache registers 42, 50. Whenever a new TCW entry is loaded into the TCW cache 50, the cache line addressed by the old entry must first be flushed to memory 10 if it was dirty. This is performed in circuit 56 using the D-bit of cache control register 42.

If the second compare 176 also results in a page miss, it is necessary to load a new entry from the TCW table 40. First, a check is made to see if the cache line is invalid 178 using the I-bit. If not, a check is made to see if the currently selected cache line is dirty 180. This check is made of the D-bit within the cache control register 42. If so, that cache line is written to memory 182 as described above. A test is made to see if there was an error in the transfer 184, and if so it is reported and logged. If there is no error, the D-bit and C-bit are both reset to 0 186.

Whether or not the cache line was dirty, the next step is to load the new TCW entry into the TCW cache 188. This entry currently resides in the holding register 76, and can be loaded into the TCW cache 50 without the necessity of again accessing the TCW table 40. The 26 MSB of the current I/O address are then loaded into the cache control register 190, and control passes to step 116.

In most cases, each device on the I/O bus will be allocated a single line in the cache buffer 22. For these devices, the DIR fields in the TCW table 40 should all be set to the same value as the value of the DEVICE SELECT which corresponds to each device. In some cases, it will be desired for some devices to have more than one line in the cache buffer 22. For these devices, the DIR fields in the entries in the TCW table 40 are set to point to the appropriate lines in the cache buffer 22. As described above, when there is a TCW miss, the next entry in the TCW table 40 determines which line of the cache buffer 22 is used next. By setting the DIR fields of these entries to point to different lines of the cache buffer 22 which are reserved for a single device, that device can use more than one line in the cache buffer 22.

The DIR fields in the TCW table 40 are allocated by the user, which will typically be an operating system program. Different systems, having different usage statistics, can be reconfigured through the operating system by adjusting the values in the DIR fields of the TCW table 40 to make most efficient use of the cache buffer 22. Manipulation of DIR fields in a cache, although used differently than in the present invention, is described in U.S. Pat. No. 4,719,568, by Carrubba et al, titled HIERARCHICAL MEMORY SYSTEM INCLUDING SEPARATE CACHE MEMORIES FOR STORING DATA AND INSTRUCTIONS.

When a device is opened, often at system power up, it is allocated some memory space. At that time, the line or lines in cache buffer 22 which it will use are determined. The DIR entries in the TCW table 40 corresponding to the allocated memory space are set to point to the selected line or lines in cache buffer 20. When the device is deallocated, the lines in the cache buffer 20 are freed for use by other device.

As will be appreciated by those skilled in the art, the input/output cache controller described above provides an efficient interface between I/O devices attached to an I/O bus 12 and system memory 10. The use of a DIR field allows more than one 64 bit line within the cache buffer 22 to be allocated to a single input/output device. The described buffer 22 and controller 14 appear to the user as a 16-way set associative cache.

The described input/output cache controller also provides virtual to real page translation, and automatic hardware access authorization checking. Access is allocated on a virtual page basis, with every access by an input/output device checked to see whether that device is authorized to perform the operation. Since the authorization checking is performed in hardware, it is fast and cannot be bypassed by software without breaking a trusted error handler within the operating system.

While the invention has been particularly shown and described with reference to a preferred embodiment, it will be understood by those skilled in the art that various changes in form and detail may be made therein without departing from the spirit and scope of the invention.

We claim:

1. An input/output cache for use in a digital computer system having a plurality of input/output devices connected to an input/output bus, the cache comprising:

a cache buffer connected to an input/output bus and to a main system memory, wherein the cache buffer is organized as a plurality of lines;

a cache control register file having a plurality of registers, each cache control register corresponding to one of the cache buffer lines and containing a main memory address corresponding to the corresponding cache buffer line;

a channel status register file having a plurality of channel status registers, each corresponding to a single input/output device attached to the input/output bus, and each channel status register containing a control field for selecting one of the cache control registers and its corresponding cache buffer line;

means for selecting one of the channel status registers when the corresponding input/output bus;

a comparator for comparing an address placed on the input/output bus, by an input/output device performing a data access, with the address contained in the cache control register selected by the selected channel status register control field, and for generating a cache hit signal if they match, else generating a cache hit signal; and means for, if a cache hit signal is generated, causing the input/output device to perform a data access of the corresponding cache buffer line.

2. The cache of claim 1, further comprising means for, if a cache miss is generated by the comparator, loading a new value into the channel status register control field for the channel status register corresponding to the input/output device performing a data access, wherein a different cache control register is selected by such channel status register, wherein one input/output device can select a second cache control register after a cache miss.

3. The cache of claim 1, further comprising a Translation Control Work (TCW) cache register file having a plurality of TCW cache registers, each corresponding to a cache control register, each TCW cache register containing a field which holds a main memory real page number corresponding to a virtual page number for the buffer line corresponding to that cache control register.

4. An input/output cache for use in a digital computer system, such system including a central processor, a main system memory, an input/output bus, and a plurality of input/output devices connected to the input/output bus, the cache comprising:

a buffer memory containing data organized as a plurality of lines, wherein the buffer memory is connected to the main system memory for exchanging data therewith;

a cache control memory for containing an identifying address indicating a location in main system memory corresponding to each of the buffer memory lines;

means for assigning at least one of the buffer memory lines to a selected input/output device, wherein a line assigned to an input/output device is used for buffering data only for that input/output device, and wherein the selected input/output device accesses main system memory only through an assigned buffer memory line;

means for assigning at least one of the buffer memory lines to the central processor, wherein the central processor accesses locations in the main system memory through an assigned buffer memory line;

a comparator connected to the input/output bus and to the buffer memory, wherein the comparator compares identifying addresses from the cache control memory to addresses present on the input/output bus, and generates a cache hit signal if there is a match;

control means for determining which input/output or central processor device has placed an address on the input/output bus, and for causing the comparator to compare an identifying address, corresponding to a buffer memory line assigned to the determined device, with an address on the input/output bus; and means for allowing an input/output device which has placed an address on the input/output bus to access a buffer line assigned to it when the comparator generates a cache hit signal.

5. The cache of claim 4, wherein the control means further restricts the identifying addresses to a portion, less than all, of the addresses contained in the main system memory.

6. The cache of claim 4, wherein the main system memory corresponds to a first portion of a main memory address space, and wherein a bus memory is attached to and accessible over the input/output bus, and further wherein the bus memory corresponds to a second portion of the main memory address space.

7. The cache of claim 6, wherein addresses in the bus memory are accessed directly by the central processor and input/output devices, without transfer of data through the buffer memory.

* * * * *